(12) United States Patent
Dallinger et al.

(10) Patent No.: US 11,344,984 B2
(45) Date of Patent: May 31, 2022

(54) MACHINING FACILITY AND METHOD FOR CHANGING A TOOL IN THE MACHINING FACILITY (71) Applicant: Fill Gesellschaft m.b.H., Gurten (AT)

(72) Inventors: Friedrich Dallinger, Gurten (AT); Johannes Fischer, Gurten (AT)

(73) Assignee: Fill Gesellschaft m.b.H., Gurten (AT)

(*) Notice: Subject to any disclaimer, the term of this patent is extended or adjusted under 35 U.S.C. 154(b) by 77 days.

(21) Appl. No.: 16/607,822

(22) PCT Filed: Apr. 25, 2018

(86) PCT No.: PCT/AT2018/060078
§ 371 (c)(1),
(2) Date: Oct. 24, 2019

(87) PCT Pub. No.: WO2018/195572
PCT Pub. Date: Nov. 1, 2018

(65) Prior Publication Data
US 2020/0180089 A1 Jun. 11, 2020

(30) Foreign Application Priority Data
Apr. 25, 2017 (AT) .............................. A 50334/2017

(51) Int. Cl.
*B23Q 3/157* (2006.01)
*B23Q 3/155* (2006.01)

(52) U.S. Cl.
CPC ...... *B23Q 3/15503* (2016.11); *B23Q 3/15513* (2013.01); *B23Q 3/15533* (2013.01);
(Continued)

(58) Field of Classification Search
CPC ........... Y10T 483/1748; Y10T 483/175; Y10T 483/1752; Y10T 483/1755;
(Continued)

(56) References Cited

U.S. PATENT DOCUMENTS 3,647,090 A * 3/1972 Suzuki ............... B23Q 3/15766
483/52
3,648,090 A * 3/1972 Voin ....................... H02K 23/56
310/191
(Continued)

FOREIGN PATENT DOCUMENTS

| CN | 101269469 A | 9/2008 |
|---|---|---|
| CN | 102029657 A | 4/2011 |

(Continued)

OTHER PUBLICATIONS

International Search Report in PCT/AT2018/060078, dated Nov. 6, 2018.

*Primary Examiner* — Erica E Cadugan
*Assistant Examiner* — Michael Vitale
(74) *Attorney, Agent, or Firm* — Collard & Roe, P.C.

(57) ABSTRACT

The invention relates to a processing plant (1) comprising: at least one first working spindle (2);
a tool magazine (6) for storing different processing tools (4), wherein at least one storage plane (10) having several tool receiving spaces (11) arranged next to one another is provided in the tool magazine (6);
a tool change device (5) comprising at least one first gripper device (13) for exchanging the processing tool (4) held in the working spindle (2), wherein the gripper device (13) comprises at least one first gripper unit (15) and one second gripper unit (16) which are positioned at a gripper-unit distance (17) from one another.

The gripper units (15, 16) can be displaced between the working spindle (2) and the tool magazine (6).

6 Claims, 6 Drawing Sheets

(52) U.S. Cl.
CPC ...... *B23Q 3/15539* (2016.11); *B23Q 3/15786* (2013.01); *B23Q 3/15793* (2013.01); *B23Q 2003/155418* (2016.11); *B23Q 2003/155446* (2016.11); *Y10T 483/10* (2015.01); *Y10T 483/1755* (2015.01); *Y10T 483/1771* (2015.01); *Y10T 483/1779* (2015.01); *Y10T 483/1845* (2015.01)

(58) Field of Classification Search
CPC ......... Y10T 483/1767; Y10T 483/1769; Y10T 483/1771; Y10T 483/1779; Y10T 483/1783; Y10T 483/1786; Y10T 483/1788; Y10T 483/1845; Y10T 483/1873; Y10T 483/1891; Y10T 483/10; B23Q 3/15503; B23Q 2003/155414; B23Q 2003/155418; B23Q 2003/155425; B23Q 2003/155428; B23Q 2003/155435; B23Q 2003/155439; B23Q 2003/155446; B23Q 2003/155449; B23Q 3/15724; B23Q 3/15726; B23Q 3/15793
USPC ......... 483/10, 11, 22, 23, 37, 38, 39, 44, 45, 483/46, 49, 51, 52, 53, 63, 66, 68, 1
See application file for complete search history.

(56) References Cited

U.S. PATENT DOCUMENTS

| | | | | |
|---|---|---|---|---|
| 4,221,043 | A * | 9/1980 | Dailey | ............... B23Q 3/15713 483/44 |
| 4,402,125 | A * | 9/1983 | Carroll | ............... B23Q 3/15766 483/36 |
| 4,577,389 | A * | 3/1986 | Shultz | ................ B23Q 3/15513 483/23 |
| 5,107,581 | A | 4/1992 | Reuter et al. | |
| 9,914,189 | B2 | 3/2018 | Burkhardt et al. | |
| 9,919,395 | B2 | 3/2018 | Davis et al. | |
| 9,925,631 | B2 | 3/2018 | Prust et al. | |
| 10,137,545 | B2 | 11/2018 | George | |
| 2003/0115736 | A1 | 6/2003 | Kurz et al. | |
| 2007/0184954 | A1 | 8/2007 | Muser | |
| 2008/0039306 | A1 * | 2/2008 | Yang | ................... B23Q 3/15713 483/68 |
| 2012/0107064 | A1 * | 5/2012 | Chen | ......................... B23C 1/08 409/203 |
| 2020/0001417 | A1 * | 1/2020 | Saeufferer | ................ B23Q 1/03 |

FOREIGN PATENT DOCUMENTS

| | | | | |
|---|---|---|---|---|
| CN | 104057341 A | | 9/2014 | |
| CN | 105579191 A | | 5/2016 | |
| DE | 3330442 A1 | * | 12/1984 | ......... B23Q 3/15793 |
| DE | 42 15 697 A1 | | 11/1993 | |
| DE | 4421624 A1 | * | 1/1996 | ........... B23Q 3/1554 |
| DE | 10 2006 038 500 A1 | | 2/2008 | |
| DE | 102009037930 A1 | * | 2/2011 | ......... B23Q 3/15766 |
| DE | 10 2012 111 230 A1 | | 5/2014 | |
| EP | 0 319 914 A1 | | 6/1989 | |
| EP | 1 291 125 A1 | | 3/2003 | |
| EP | 1754565 A1 | * | 2/2007 | ............. B23Q 1/601 |
| ES | 2 246 130 A1 | | 2/2006 | |
| FR | 2 108 232 A1 | | 5/1972 | |
| FR | 2515948 A | * | 5/1983 | ............... A47F 5/05 |
| GB | 1 349 177 A | | 3/1974 | |
| JP | 05-269635 A | * | 10/1993 | ......... B23Q 3/15503 |
| JP | 09-029575 A | * | 2/1997 | ......... B23Q 3/15503 |
| WO | 2006/060551 A2 | | 6/2006 | |
| WO | 2013/034388 A2 | | 3/2013 | |
| WO | WO-2015/104945 A1 | * | 7/2015 | ......... B23Q 3/15513 |

* cited by examiner

MACHINING FACILITY AND METHOD FOR CHANGING A TOOL IN THE MACHINING FACILITY

CROSS REFERENCE TO RELATED APPLICATIONS

This application is the National Stage of PCT/AT2018/060078 filed on Apr. 25, 2018, which claims priority under 35 U.S.C. § 119 of Austrian Application No. A 50334/2017 on Apr. 25, 2017, the disclosure of which is incorporated by reference. The international application under PCT article 21(2) was not published in English.

BACKGROUND OF THE INVENTION

1. Field of the Invention

The invention relates to a method for carrying out a tool change on a processing plant, as well as to a processing plant with a tool change device.

2. Description of the Related Art

DE102006038500A1 discloses a processing machine with a tool magazine. In a thus designed processing machine, the transports of processing tools between the processing spindle and the tool magazine take a long time.

SUMMARY OF THE INVENTION

It was the object of the present invention to overcome the shortcomings of the prior art and to provide a device and a method by means of which the set-up times can be kept as short as possible in order to minimize non-productive times.

This object is achieved by means of a device and a method according to the claims.

According to the invention, a method for carrying out a tool change on a processing plant is provided. The processing plant comprises:
at least one first working spindle;
a tool magazine for storing different processing tools, wherein at least one storage plane having several tool receiving spaces arranged next to one another is provided in the tool magazine;
a tool change device comprising at least one first gripper device for exchanging the processing tool held in the working spindle, wherein the gripper device comprises at least one first gripper unit and one second gripper unit which are positioned at a gripper-unit distance from one another.

The method comprises the following method steps:
removing a processing tool that has already been used from the working spindle by means of the first gripper unit;
inserting a processing tool held in the second gripper unit into the working spindle;
moving the gripper device to the tool magazine for receiving a new processing tool from the tool magazine into the gripper device and simultaneously placing the already used processing tool from the gripper device into the tool magazine; and simultaneously
processing a workpiece by means of the processing tool held in the working spindle.

It is an advantage of the method according to the invention that the time required for fetching a processing tool from the tool storage can be kept as low as possible. This is particularly advantageous if the processing operations only require a very short period of time and a new processing tool is needed as quickly as possible.

It can further be provided for that a second working spindle is arranged next to the first working spindle, wherein the working spindles are arranged in parallel to one another and serve for receiving one processing tool each and that the tool change device comprises a second gripper device, wherein the two gripper devices are moved synchronously to one another and simultaneously serve the two working spindles. Hence, the two working spindles can be operated synchronously to one another.

It can further be useful if for receiving a new processing tool from the tool magazine into the gripper device and simultaneous placing of the already used processing tool from the gripper device into the tool magazine, the processing tools are arranged in the storage plane such that the new processing tool is arranged in a first tool receiving space and in the gripper-unit distance to the first tool receiving space a second tool receiving space, which serves for placing the already used processing tool from the gripper device into the tool magazine, is free. The advantage of this is that by this measure, the gripper device with the two gripper units and the processing tool held in one of the gripper units can be moved to the respective storage unit so as to place the processing tool down. At this, the processing tool is guided into the free tool receiving space. Simultaneously, the newly envisaged processing tool is gripped by means of the free gripper unit and can then be guided to the working spindle of the processing plant. It is possible to keep the time effort for performing the placing down of the old processing tool and collecting the new processing tool so low, since the gripper device does not have to approach two different positions in the tool magazine, but the old processing tool can be placed down and the processing tool can be collected simultaneously in one operation. At this, the processing tools are positioned such in the tool magazine that the described processing steps are allowed for.

It can further be provided for that processing tools can be manually inserted in a tool insertion station and in further consequence can be collected by means of a gripper unit. The advantage of this is that processing tools envisaged for processing operations to be used in the future can be inserted and can be moved to a free space in the tool magazine by means of the gripper unit.

In addition to this, it can be provided for that in selected processing operations, in particular in processing operations with a long processing time, the processing tools stored in the tool magazine are newly sorted by means of the gripper device during processing of the workpiece. The advantage of this is that the processing tools can be newly sorted according to the future envisaged processing steps so as to find a free tool receiving space next to a processing tool to be changed and thus enable the tool change operation according to the invention.

It can moreover be useful if processing tools which in the processing sequence follow such processing tools by means of which shorter processing steps are carried out are stored closer to the working spindle than processing tools which in the processing sequence follow such processing tools by means of which longer processing steps are carried out. By this measure, it can be achieved that during processing by means of a processing tool with short processing time, a quick changing operation is ensured as the gripper device only has to cover short distances. Thereby, also during this short time span, a new processing tool can be fetched from the tool storage.

According to a further embodiment, it is possible that processing tools which are used more often are stored closer to the working spindle than processing tools, which are used less often. By this measure, it can be achieved that for processing tools that are used often, a quick changing operation is ensured as the gripper device only has to cover short distances.

It can further be useful if the already used processing tool after removal from the working spindle is guided to a measuring device, in which wear of the processing tool is detected, by means of the gripper device. The advantage of this is that by this measure, the wear of the processing tool and/or a potential fracture of the processing tool can be detected. Hence, even before storing the processing tool in the tool magazine, an exchange of the processing tool can be requested and/or the processing tool can be placed at a corresponding location, where it can be exchanged.

According to the invention, a processing plant is provided for, which comprises the following components:
at least one first working spindle and one second working spindle, which are arranged in parallel to one another and serve for receiving one processing tool each;
a tool magazine for storing different processing tools, at least one storage plane having several tool receiving spaces arranged next to one another is provided in the tool magazine;
a tool change device comprising at least one first gripper device and one second gripper device for exchanging the processing tools held in the working spindles, wherein the gripper devices each comprise at least one first gripper unit and one second gripper unit which are positioned at a gripper-unit distance from one another.

The gripper units can be displaced between the respective working spindle and the tool magazine.

The advantage of the processing plant according to the invention is that the time required for fetching a processing tool from the tool storage can be kept as low as possible. This is particularly advantageous if the processing operations only require a very short period of time and a new processing tool is needed as quickly as possible.

It can further be provided for that the distance between two adjacent tool receiving spaces of a storage plane corresponds to the gripper-unit distance or to a unit fraction of the gripper-unit distance. In other words that the gripper-unit distance is an integer multiple of the distance between two adjacent tool receiving spaces of a storage plane. The advantage of this is that by this measure, simultaneously an already used processing tool can be placed in the tool storage and a processing tool envisaged for future processing steps can be collected from the tool storage.

According to a particular embodiment, it is possible that several storage planes are arranged on top of one another in the tool magazine, wherein the distance between two adjacent tool receiving spaces in the different storage planes is of different size. Hence, the different storage planes can be designed for receiving processing tools of different sizes.

According to an advantageous embodiment, it can be provided for that the gripper devices are mounted on a gripper device cradle so as to be displaceable in transverse direction.

In particular, it can be advantageous if the gripper devices are displaceable in transverse direction by means of a central drive motor and are displaced in opposite directions to one another. The advantage of this is that one drive motor only is required for displacing the gripper devices. The gripper devices can hence be operated synchronously for both working spindles.

It can further be provided for that the gripper devices are mounted on the gripper device cradle so as to be pivotable with respect to a vertical axis. Thereby, the gripper devices can collect processing tools, which are for example stored at an angle of 90° to the spindle axis of the working spindle, from the tool magazine. The possible pivoting angle can of course be larger than 90°.

In addition to this, it may be provided for that the gripper device cradle is mounted on a height-adjustment device so as to be adjustable in height. By this measure, different storage planes in the tool magazine can be reached.

An embodiment, according to which it can be provided for that the height-adjustment device is mounted so as to be displaceable in a longitudinal direction extending in parallel to the spindle axis of the working spindle by means of a linear guide, is also advantageous.

According to a further embodiment, it is possible that the linear guide is arranged at the center of the processing plant.

It can further be useful if a first tool magazine section is formed, which is assigned to the first working spindle, and a second tool magazine section is formed, which is assigned to the second working spindle, wherein the two tool magazine sections are arranged on the processing plant symmetrically with respect to a mid-plane. The advantage of this is that the processing tools for the first working spindle and for the second working spindle can be stored in and/or removed from the tool magazine simultaneously and in parallel to one another.

It can further be provided for that the tool magazine comprises two storage systems arranged at a distance from one another and each having several tool receiving spaces arranged on top of one another, wherein the storage systems are adjustable in height relative to one another such that different pairings of tool receiving spaces can be set. For example, it can be provided for that the two storage systems each comprise a paternoster system with several tool receiving spaces. In a further embodiment, it can also be provided for that the two storage systems each comprise a linear rail system. It is of course provided for that such a structure of storage systems is assigned to each of the working spindles.

The features according to the invention are particularly advantageous for processing plants with two working spindles. However, the features also have great advantages for processing plants with one working spindle only.

For the purpose of better understanding of the invention, it will be elucidated in more detail by means of the figures below.

BRIEF DESCRIPTION OF THE DRAWINGS

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
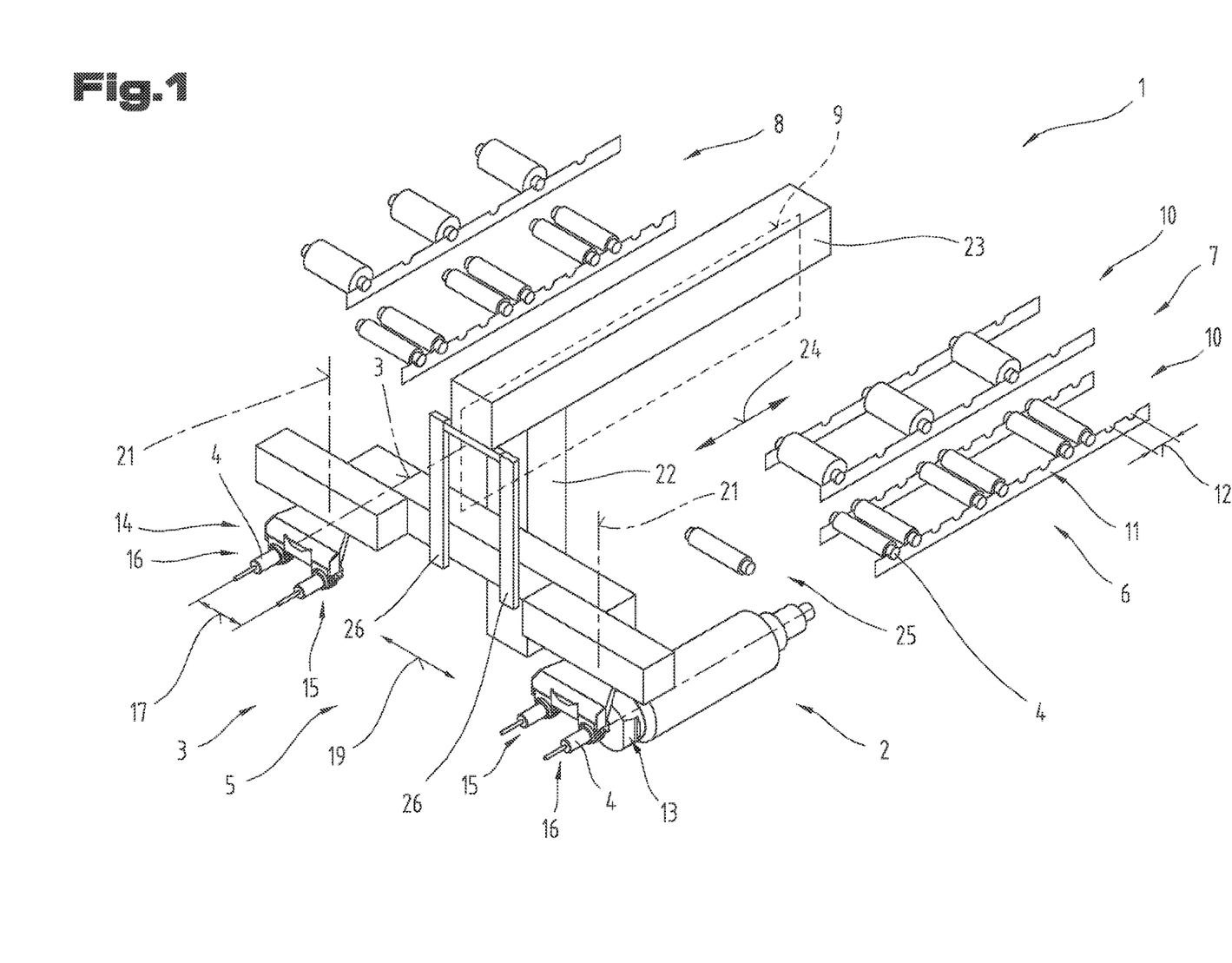
FIG. 1 a perspective representation of an exemplary embodiment of a processing plant.

FIG. 1 shows a perspective view of an exemplary embodiment of the processing plant 1 in a schematic representation. The processing plant 1 particularly serves for machining workpieces, wherein a first working spindle 2 and a second working spindle 3 in which processing tools 4 can be received are formed. In order to represent the essence of the invention, essential components of the processing plant 1 are not shown. The first working spindle 2 is adumbrated schematically. The second working spindle 3 is merely adumbrated by a central line for reasons of clarity.

FIG. 1 shows a tool change device 5 for changing the processing tools 4 and a tool magazine 6 for receiving the processing tools 4.

The tool magazine 6 in particular serves for providing and storing different processing tools 4 for different processing operations. As can be gathered from FIG. 1, it can be provided for that the tool magazine 6 comprises a first tool magazine section 7 and a second tool magazine section 8, which are formed symmetrically with respect to a mid-plane 9. It is thus provided for that the first tool magazine section 7 is assigned to the first working spindle 2 and that the second tool magazine section 8 is assigned to the second working spindle 3.

Several storage planes 10 each having several tool receiving spaces 11 can be formed in the individual tool magazine sections 7, 8. The tool receiving spaces 11 are arranged next to one another in the individual storage planes 10, wherein a distance 12 between two adjacent tool receiving spaces 11 in different storage planes 10 can be of different size. For example, it can be provided for that a storage plane 10 is formed for receiving large processing tools 4, wherein the distance 12 of the individual tool receiving spaces 11 to one another is twice as big as in a further storage plane in which smaller processing tools 4 are received.

As can further be gathered from FIG. 1, the tool change device 5 comprises a first gripper device 13 and a second gripper device 14. The first gripper device 13 serves for transferring processing tools 4, which are stored in the first tool magazine section 7, to the first working spindle 2. The second gripper device 14 serves for transferring processing tools 4, which are stored in the second tool magazine section 8, to the second working spindle 3.

As the processing steps of the working spindles 2, 3 take place in parallel and/or synchronously to one another, it is also provided for that the processing tools 4 of the two working spindles 2, 3 are changed simultaneously. Thus, the same processing tools 4 are stored symmetrically to one another in the first tool magazine section 7 and in the second tool magazine section 8.

As can further be gathered from FIG. 1, a first gripper unit 15 and a second gripper unit 16 are arranged both on the first gripper device 13 and on the second gripper device 14. The first gripper unit 15 and the second gripper unit 16 each serve for collecting the already used processing tool 4 from the working spindle 2, 3 and/or for inserting a new processing tool 4 into the working spindle 2, 3.

Due to the course of process of a tool change, the already used processing tool 4 is received alternately once in the first gripping unit 15 and once in the second gripping unit 16 in each case. The new processing tool 4 is provided in the respective other gripper unit 15, 16.

The two gripper units 15, 16 are arranged at a gripper-unit distance 17 from one another. The gripper-unit distance 17 and the distance 12 between two adjacent tool receiving spaces 11 can for example be of the same size. Moreover, it is also conceivable that the gripper-unit distance 17 corresponds to an integer multiple of the distance 12 between two adjacent tool receiving spaces 11. In other words, that the distance 12 between two adjacent tool receiving spaces 11 amounts to a fraction of the gripper-unit distance 17.

Figure 2:
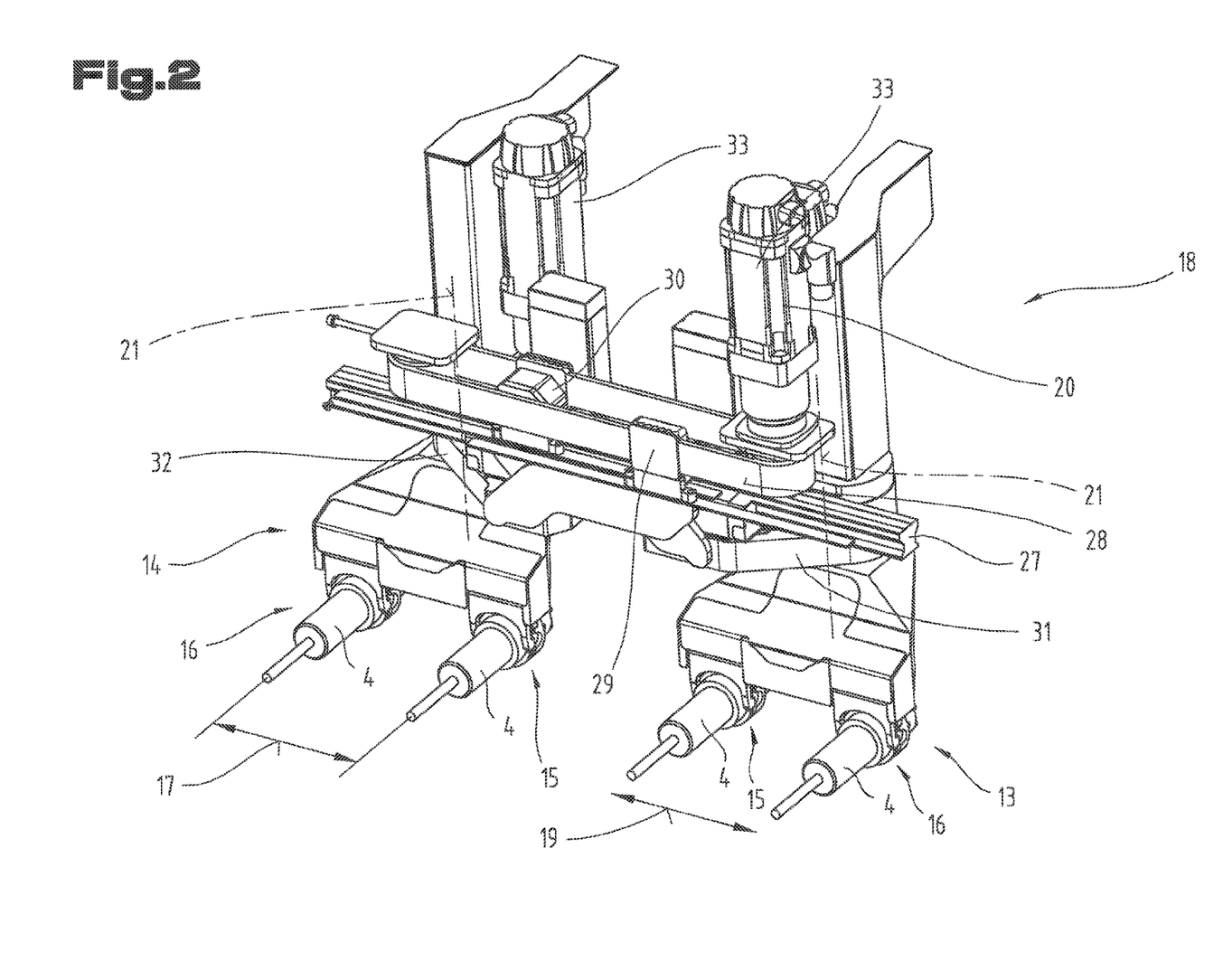
FIG. 2 a perspective representation of an exemplary embodiment of a tool change device.

The first gripper device 13 and/or the second gripper device 14 are arranged on a gripper device cradle 18, which is described in more detail in FIG. 2 and/or explained by means of the representation in FIG. 2. The two gripper devices 13, 14 are displaceable in transverse direction 19 relative to one another and/or relative to the gripper device cradle 18. This can prefer-ably be achieved by means of a central drive motor 20.

Moreover, it is provided for that the two gripper devices 13, 14 are arranged on the gripper device cradle 18 so as to be pivotable about a vertical axis 21.

The gripper device cradle 18 is mounted on a height-adjustment device 22, by means of which it can be displaced in its height. Thereby, both the working spindles 2, 3 and the different storage planes 10 of the tool magazine 6 can be reached by means of the gripper devices 13, 14.

The height-adjustment device 22 is mounted on a linear guide 23, which extends in the longitudinal direction 24 of the processing plant 1. Hence, the gripper devices 13, 14 can be adjusted in the longitudinal direction 24.

The height-adjustment device 22 comprises guide rails on which the gripper device cradle 18 is displaceably mounted. An electric motor, in particular a servomotor, and an adjustment spindle connected thereto can for example serve as a drive for the height-adjustment device 22. Of course, other drive units, such as a timing belt, a toothed rack or the like can be used as well.

The linear guide 23 also comprises guide rails by means of which the height-adjustment device 22 is displaceably mounted on the base frame of the processing plant 1. As a drive for the linear guide 23, for example an electric motor which cooperates with a toothed rack can be used.

Moreover, as can be gathered from FIG. 1, it can be provided for that a tool insertion station 25 is formed, into which processing tools 4 can be inserted and can be gripped by the gripper devices 13, 14.

The tool insertion station 25 can comprise conveying devices, by means of which the processing tools 4 at an insertion position can be conveyed to a further position, in which the processing tools 4 can be gripped by means of the gripper devices 13, 14. In particular, it is also conceivable that merely one tool insertion station 25 is provided, in which tools can be inserted for both the first tool magazine section 7 and the second tool magazine section 8.

In addition to this, it can be provided for that a measuring device 26 is formed, which serves for measuring used processing tools 4. In this regard, it can in particular be provided for that after removal from the working spindles 2, 3 the processing tools 4 are moved to the measuring device 26 by means of the gripper devices 13, 14 and are measured there. In particular, it can be provided for that the measuring device 26 is formed in proximity to the working spindles 2, 3.

FIG. 2 shows a detailed view of the processing plant 1, wherein again, equal reference numbers and/or component designations are used for equal parts as before in FIG. 1. In order to avoid unnecessary repetitions, it is pointed to/reference is made to the detailed description in FIG. 1 preceding it.

FIG. 2 shows a perspective representation of an exemplary embodiment of the gripper device cradle 18 along with the first gripper device 13 and the second gripper device 14. As can well be seen from FIG. 2, the gripper devices 13, 14 are mounted on the gripper device cradle 18 so as to be displaceable by means of a guide rail 27. Hence, the gripper devices 13, 14 can be displaced in transverse direction 19. In particular, it can be provided for that the drive motor 20, for displacing the gripper devices 13, 14, is coupled to a timing belt 28, wherein the timing belt 28 is connected to a first driver element 29 and to a second driver element 30. The first driver element 29 cooperates with the first gripper device 13 and the second driver element 30 cooperates with the second gripper device 14.

As can be gathered from FIG. 2, the two driver elements 29, 30 are arranged on opposite sides of the timing belt 28, whereby when the timing belt 28 is moved, the two gripper devices 13, 14 are displaced in opposite directions to one another by means of the drive motor 20.

As can well be gathered from FIG. 2, it can in particular be provided for that the gripper devices 13, 14 are arranged on a first displacement unit 31 and/or on a second displacement unit 32, which are displaceable relative to the gripper device cradle 18. The gripper units 15, 16 can be rotatable relative to the displacement units 31, 32 and thus relative to the gripper device cradle 18 with respect to a vertical axis 21. In particular, it can be provided for that a separate rotation motor 33, by means of which the gripper devices 13, 14 can be rotated relative to the displacement unit 31, 32, is provided for each gripper device 13, 14. The rotation motor 33 can be coupled to the gripper device 13, 14 either directly or by means of a gear wheel or a gear. In addition to this, the rotation motor 33 can be received and/or held on the displacement unit 31, 32.

FIGS. 3 to 6 show a further and possibly independent embodiment of the processing plant 1, wherein again, equal reference numbers and/or component designations are used for equal parts as in FIGS. 1 and 2 above. In order to avoid unnecessary repetitions, it is pointed to/reference is made to the detailed description in FIGS. 1 and 2 preceding it.

FIGS. 3 to 6 show the processing plant 1 in a highly simplified representation, wherein individual method steps of carrying out a tool change are represented.

Figure 3:
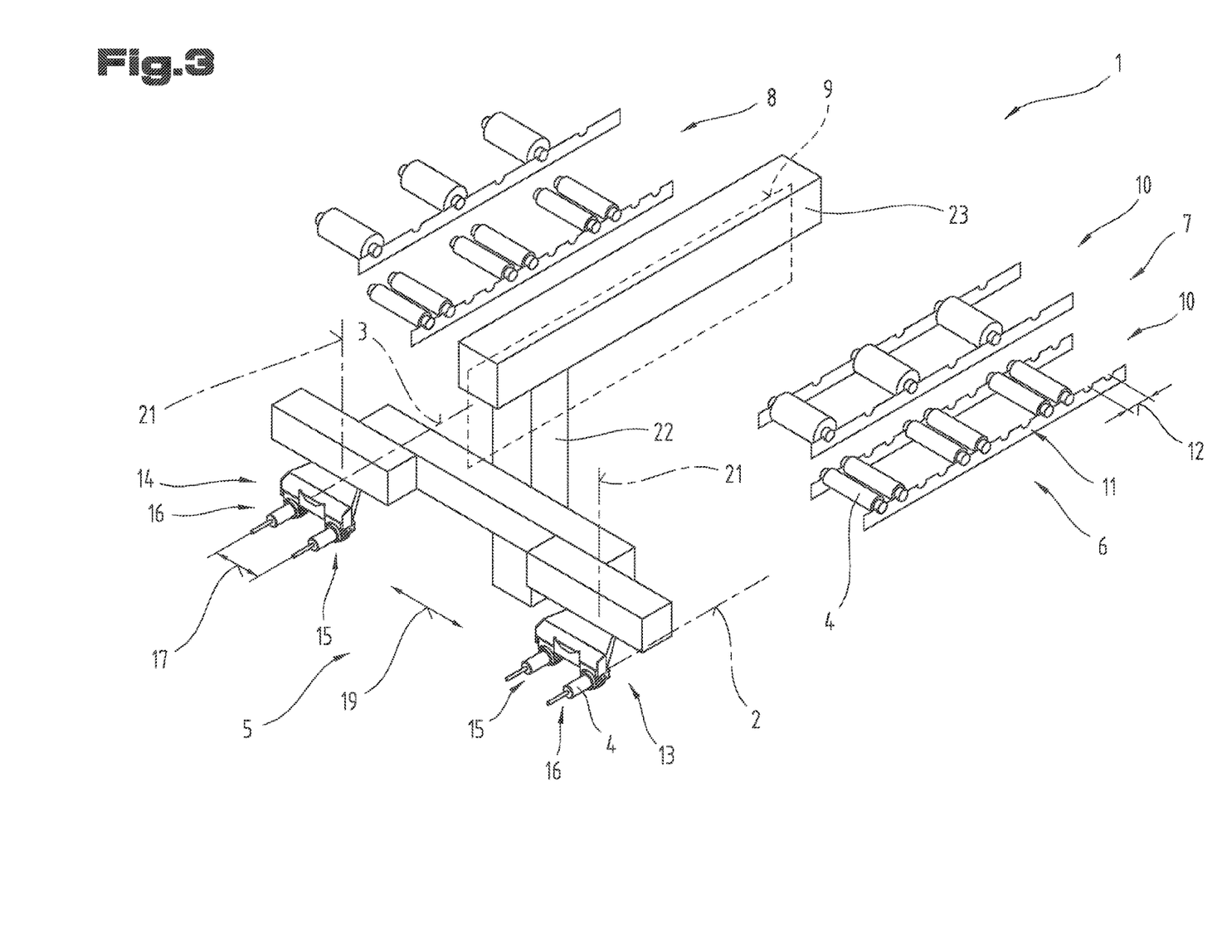
FIG. 3 a schematic representation of a first processing step in a tool change operation.

As can be gathered from FIG. 3, a new processing tool 4, which is to be used in the next processing step, is in each case located in the first gripper unit 15 of the two gripper device 13, 14, and the second gripper units 16 are free. The gripper devices 13, 14 are moved to the working spindles 2, 3 such that the processing tool 4 currently held in the working spindle 2, 3 can be gripped by means of the second gripper unit 16 in each case and can be removed from the working spindle 2, 3.

Figure 4:
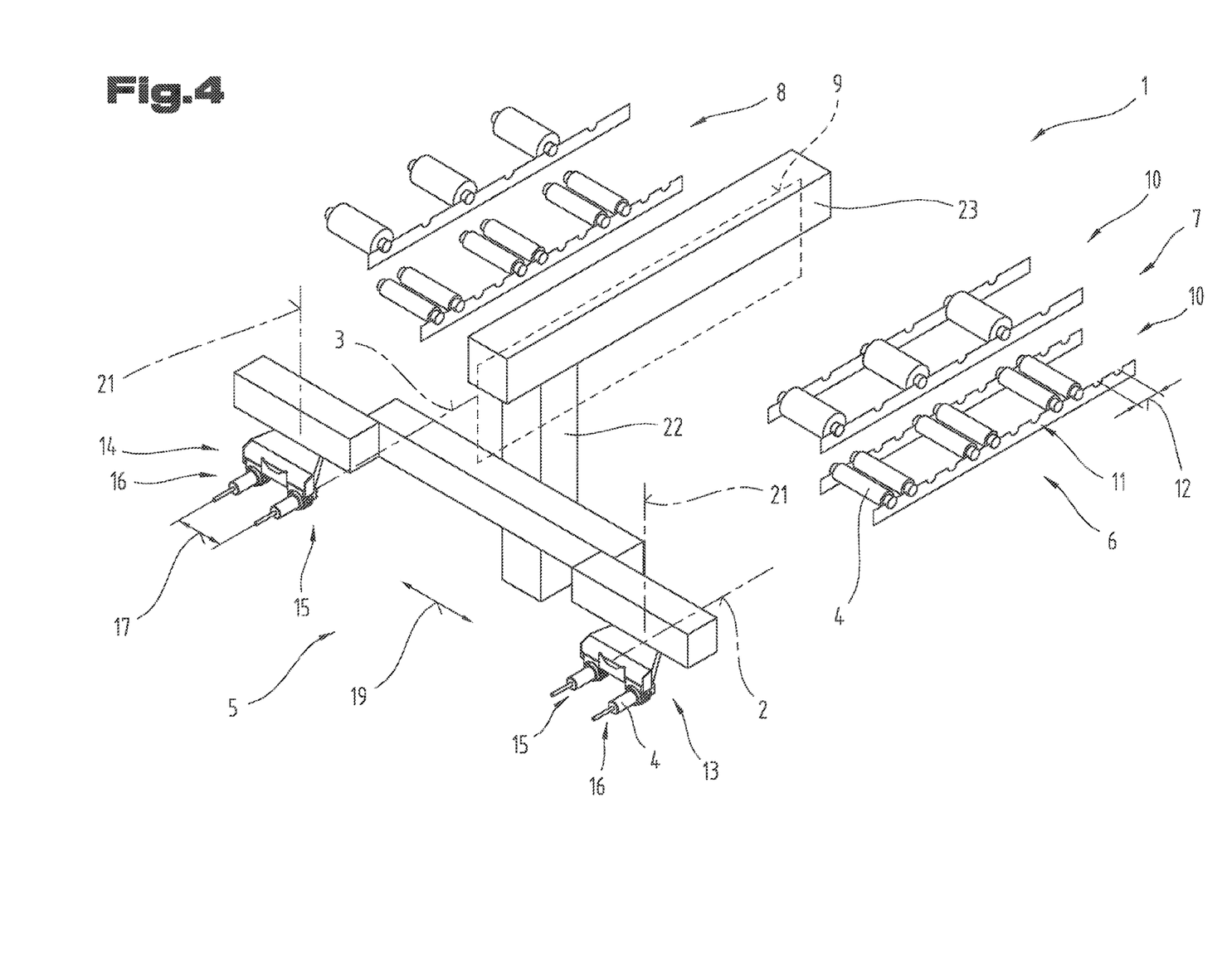
FIG. 4 a schematic representation of a second processing step in a tool change operation.

Subsequently, according to the representation in FIG. 4, the two gripper devices 13, 14 are displaced in transverse direction 19 such that the new processing tool, which is held in the first gripper units 15, can be inserted into the working spindle 2, 3.

Figure 5:
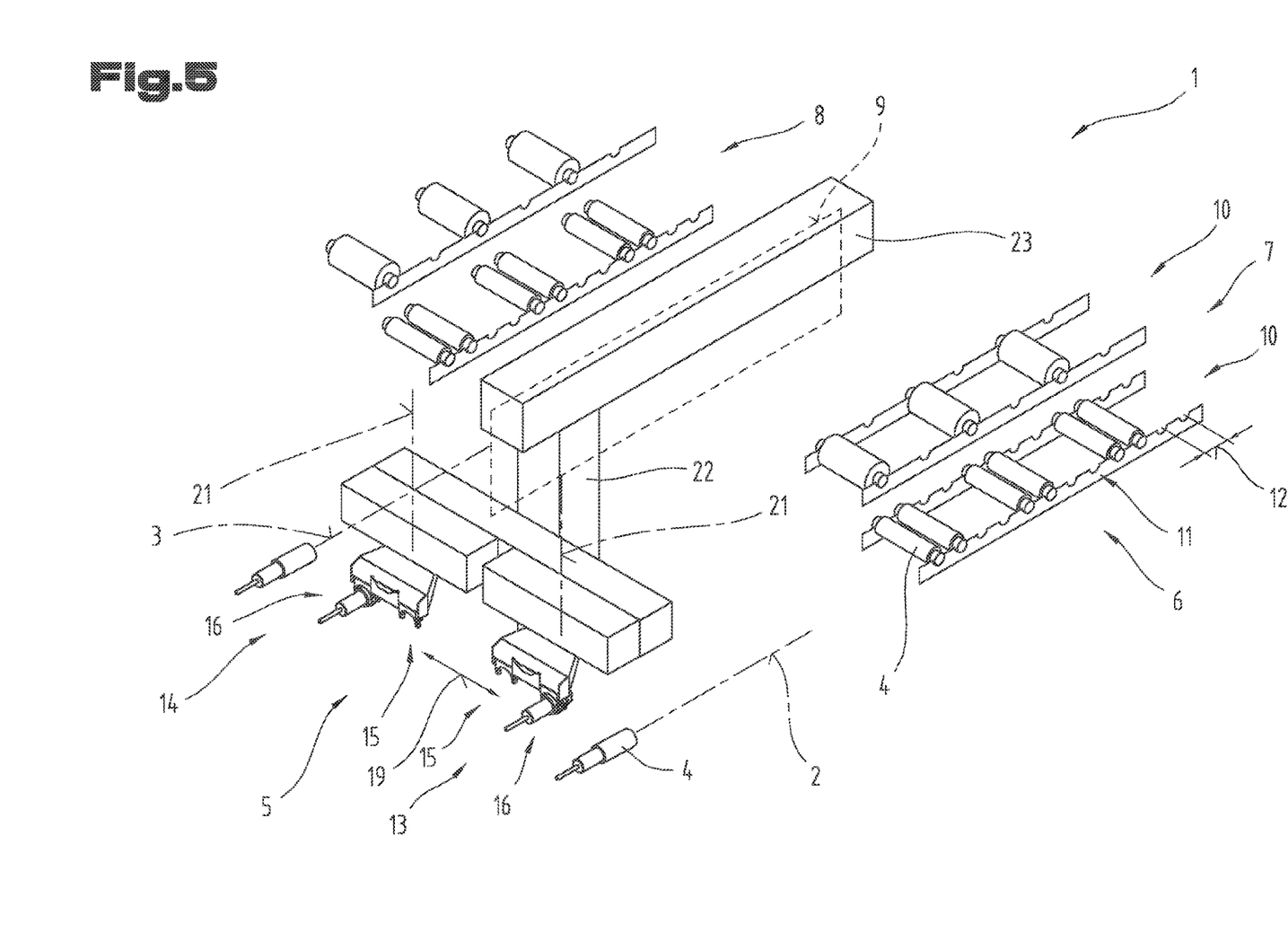
FIG. 5 a schematic representation of a third processing step in a tool change operation.
Figure 6:
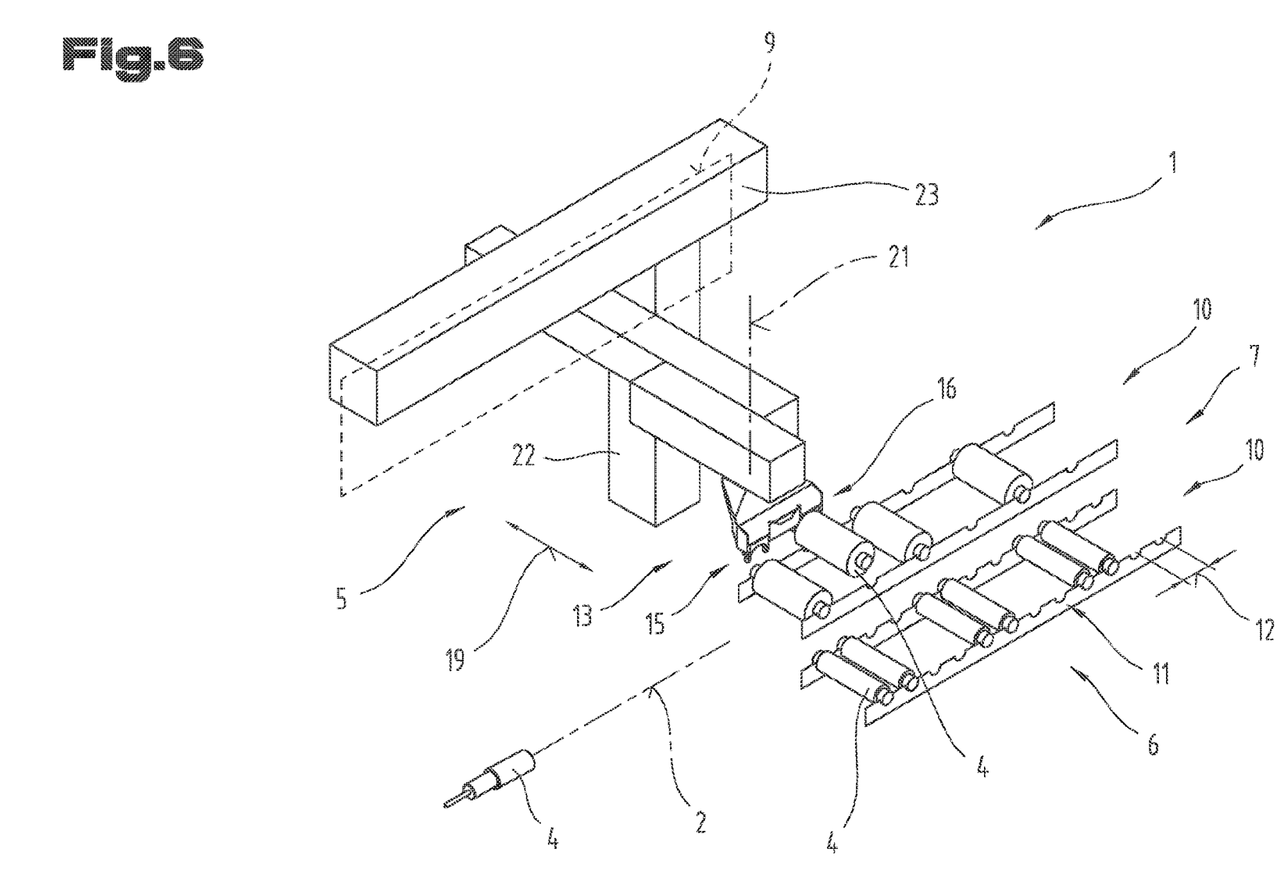
FIG. 6 a schematic representation of a fourth processing step in a tool change operation.

Once the processing tool 4 has been inserted into the working spindle 2, 3, the processing tool 4 received in the second gripper unit 16 can be brought to the tool magazine 6, as is shown in FIG. 5.

Optionally, the wear of the processing tool 4 can be determined by means of the measuring device 26 prior to this.

When the gripper devices 13, 14 are moved to the tool magazine 6, the first gripper unit 15 is free and the already used processing tool 4 is held in the second gripper unit 16. The gripper devices 13, 14 are, according to the representation in FIG. 6, displaced to a storage plane 10 such that the already used processing tool 4 can be placed in a free tool receiving space 11 and simultaneously, a new processing tool 4 envisaged for the next processing step can be received at a tool receiving space 11 that is spaced at the gripper-unit distance 17. In the course of this, the second gripper unit 16 is opened so as to place down the processing tool 4 held therein and the first gripper unit 15 is closed so as to receive the new processing tool 4. Subsequently, the gripper device 13, 14 can be moved back to the working spindles 2, 3 to insert the new processing tool 4.

The insertion of the new processing tool 4 takes place analogously to the already described method steps, wherein now, not the second gripper unit 16 but the first gripper unit 15 serves for receiving the processing tool already held in the working spindle 2, 3.

It is thus provided for that in each second method round, the first gripper unit 15 serves for receiving the processing tool clamped in the working spindle 2 and in each second processing operation the second gripper unit 16 serves for receiving the processing tool 4 clamped in the working spindle 2, 3.

Furthermore, the gripper devices 13, 14 can be used for resorting the processing tools 4 in the tool magazine 6 during longer processing operations.

As can be gathered from FIGS. 1 to 6, the tool receiving spaces 11 can be formed by a storage rail, which can receive the processing tools 4. Where an individual storage rail is used, the processing tool 4 must be stored such in the storage rail that by means of a positively locked connection secure hold of the processing tool 4 in the storage rail can be achieved. Where two storage rails arranged at a distance from one another are used, the processing tool 4 can rest on both storage rails.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 processing plant
2 first working spindle
3 second working spindle
4 processing tool
5 tool change device
6 tool magazine
7 first tool magazine section
8 second tool magazine section
9 mid-plane
10 storage plane
11 tool receiving space
12 distance
13 first gripper device
14 second gripper device
15 first gripper unit
16 second gripper unit
17 gripper-unit distance
18 gripper device cradle
19 transverse direction
20 drive motor
21 vertical axis
22 height-adjustment device
23 linear guide
24 longitudinal direction
25 tool insertion station
26 measuring device
27 guide rail
28 timing belt
29 first driver element
30 second driver element
31 first displacement unit
32 second displacement unit
33 rotation motor

The invention claimed is:

1. A method for performing a tool change on a processing plant with
   a first working spindle;
   a tool magazine for storing different processing tools, wherein at least one storage plane having first and second tool receiving spaces arranged next to one another is provided in the tool magazine;
   a tool change device comprising a first gripper device for exchanging a first processing tool of the different processing tools held in the first working spindle, wherein the first gripper device comprises a first gripper unit and a second gripper unit which are positioned at a gripper-unit distance from one another;
   wherein a second working spindle is arranged next to the first working spindle;
   wherein the first and second working spindles are arranged in parallel to one another and each of the first and second working spindles is configured to receive one processing tool of the different processing tools, respectively;
   wherein the tool change device comprises a second gripper device;
   wherein the second gripper device comprises a third gripper unit and a fourth gripper unit which are positioned at the gripper-unit distance from one another;
   wherein the method comprises the following method steps:
   removing the first processing tool after the first processing tool has already been used from the first working spindle by means of the first gripper unit and simultaneously removing a fourth processing tool after the fourth processing tool has already been used from the second working spindle by means of the third gripper unit;
   inserting a second processing tool of the different processing tools held in the second gripper unit into the first working spindle and simultaneously inserting a fifth processing tool of the different processing tools held in the fourth gripper unit into the second working spindle;
   moving the first gripper device to the tool magazine for receiving a new third processing tool of the different processing tools from the tool magazine into the first gripper device and simultaneously placing the first processing tool after the first processing tool has already been used from the first gripper device into the tool magazine and simultaneously moving the second gripper device to the tool magazine for receiving a new sixth processing tool of the different processing tools from the tool magazine into the second gripper device and simultaneously placing the fourth processing tool after the fourth processing tool has already been used from the second gripper device into the tool magazine; and
   simultaneously
   processing a workpiece by means of the second processing tool held in the first working spindle and simultaneously processing a workpiece by means of the fifth processing tool held in the second working spindle;
   wherein the first and second gripper devices are moved synchronously to one another and simultaneously serve to transfer a processing tool of the different processing tools to the first and second working spindles, respectively;
   wherein for receiving the new third processing tool from the tool magazine into the first gripper device and simultaneous placing of the first processing tool after the first processing tool has already been used from the first gripper device into the tool magazine, the processing tools are arranged in the at least one storage plane such that the new third processing tool is arranged in a first tool receiving space and at the gripper-unit distance to the first tool receiving space a second tool receiving space is free, wherein the second tool receiving space serves for placing the first processing tool after the first processing tool has already been used from the first gripper device into the tool magazine, and
   wherein for receiving the new sixth processing tool from the tool magazine into the second gripper device and simultaneous placing of the fourth processing tool after the fourth processing tool has already been used from the second gripper device into the tool magazine, the processing tools are arranged in the at least one storage plane such that the new sixth processing tool is arranged in a third tool receiving space and at the gripper-unit distance to the third tool receiving space a fourth tool receiving space is free, wherein the fourth tool receiving space serves for placing the fourth processing tool after the fourth processing tool has already been used from the second gripper device into the tool magazine, wherein the first and second gripper devices are mounted on a gripper device cradle and are each pivoted about a respective vertical axis.

2. The method according to claim 1, wherein the different processing tools can be manually inserted in a tool insertion station and in further consequence can be collected by means of the first gripper unit.

3. The method according to claim 1, wherein in selected processing operations, the different processing tools stored in the tool magazine are newly sorted by means of the first gripper device during processing of the workpiece.

4. The method according to claim 1, wherein a first set of processing tools of the different-processing tools by means of which shorter processing steps are carried out are stored closer to the first working spindle than a second set of processing tools of the different processing tools by means of which longer processing steps are carried out.

5. The method according to claim 1, wherein frequently-used processing tools of the different processing tools which are used more often are stored closer to the first working spindle than non-frequently-used processing tools of the different processing tools, which are used less often.

6. The method according to claim 1, wherein the first processing tool after the first processing tool has already been used after removal from the first working spindle is guided to a measuring device, in which wear of the first processing tool is detected, by means of the first gripper device.

* * * * *